(12) United States Patent
Kath

(10) Patent No.: US 10,028,486 B1
(45) Date of Patent: Jul. 24, 2018

(54) LIGHTWEIGHT FLEXIBLE DOG SHOES

(71) Applicant: Liy Kath, San Francisco, CA (US)

(72) Inventor: Liy Kath, San Francisco, CA (US)

(*) Notice: Subject to any disclaimer, the term of this patent is extended or adjusted under 35 U.S.C. 154(b) by 0 days.

(21) Appl. No.: 15/615,839

(22) Filed: Jun. 7, 2017

(51) Int. Cl.
*A01K 13/00* (2006.01)
*A01K 29/00* (2006.01)
*A43B 11/00* (2006.01)

(52) U.S. Cl.
CPC .......... *A01K 13/007* (2013.01); *A01K 13/001* (2013.01); *A43B 11/00* (2013.01)

(58) Field of Classification Search
CPC ....... A01K 13/007; A43B 11/00; A43B 23/00; A43B 3/06; A43B 23/0245; A43B 3/08; A43B 3/24; A43B 3/242; A43B 7/26; A43B 23/24; A43B 3/0078; A43B 3/02; A43B 3/102; A43B 3/163; A43B 5/00; A43B 1/009; A43B 23/02; A43B 23/025; A43B 23/0295; A43B 3/30
USPC .................................... 119/850, 856; 36/138
See application file for complete search history.

(56) References Cited

U.S. PATENT DOCUMENTS

| | | | |
|---|---|---|---|
| 2,446,371 A | 8/1948 | Jones | |
| 5,148,657 A | 9/1992 | Stafford et al. | |
| 5,528,885 A * | 6/1996 | Chamberlain | A01K 13/007 54/82 |
| 5,822,888 A * | 10/1998 | Terry | A43B 3/24 36/100 |
| 6,186,097 B1 | 2/2001 | Brockmann et al. | |

(Continued)

*Primary Examiner* — Yvonne R Abbott-Lewis (57) ABSTRACT

A lightweight and flexible dog shoe is described here for protecting a dog's feet from external cold or hot temperature conditions, cuts and abrasions, or other injury with a waterproof construction while allowing breathability and comfort during use. The shoes are designed to be easily put on by the dog owner with a large top opening and a Velcro strap system for securing the shoes to the dog's feet. The shoe is flexible to conform to the shape of the dog's legs while providing tactile feeling ability on the soles. The material is breathable, and acts as a check-valve with air permeability for breathability, but prevents water from entering. Adjustment is provided with Velcro straps, buckles and buttons. The front laces are for added stability and support purposes. The shoe is constructed with a synthetic materials: a multi-layer nylon fabric shell, synthetic rubber sole & toe enclosure, and is one hundred percent waterproof. The sole and toe enclosure may be constructed with resin rubber, crepe, PVC, or polyurethane. The multi-layer shell is comprised of; 1) a protective inner contact layer; 2) an insulating thickness layer; and 3) an outer waterproof shell. The dog's feet and paws enter from the rear opening, and adjustment are made via the wrap-around Velcro straps, buckles, and buttons. The Velcro straps have reflective material for visibility during nighttime or low visible light conditions. The shoes are available in different sizes: extra-small (XS), small (S), medium (M), large (L), and extra-large (XL). The name for the shoes may be branded as "YAP", "YAP DESIGNS", "YAP SHOES", or specifically "CALIGAE" as a special shoe for the kings. The shoes will protect a dog's feet and paws from hazardous environmental conditions, abrasion, dirt, chemicals, salt, as well as cold and hot weather.

20 Claims, 6 Drawing Sheets

(56) References Cited

U.S. PATENT DOCUMENTS

| | | | |
|---|---|---|---|
| 6,470,832 B1* | 10/2002 | Peacock | A01K 13/007 |
| | | | 119/850 |
| 6,526,920 B1* | 3/2003 | Griffin | A01K 13/007 |
| | | | 119/850 |
| D521,693 S | 5/2006 | Alameddine et al. | |
| 7,971,557 B2 | 7/2011 | Paxton et al. | |
| 8,109,241 B2* | 2/2012 | Wrenwood Maloney | A01K 13/007 |
| | | | 119/850 |
| 8,161,668 B2* | 4/2012 | Ketzenberg | A01K 13/007 |
| | | | 119/850 |
| 8,176,880 B2* | 5/2012 | Hurwitz | A01K 13/007 |
| | | | 119/850 |
| 8,360,012 B2 | 1/2013 | Friedland | |
| 8,567,350 B2 | 10/2013 | Maloney et al. | |
| 2005/0241188 A1 | 11/2005 | Yun et al. | |
| 2007/0039565 A1* | 2/2007 | Krottinger | A01K 13/007 |
| | | | 119/850 |
| 2008/0127907 A1* | 6/2008 | Purtell | A61D 9/00 |
| | | | 119/850 |
| 2014/0251642 A1* | 9/2014 | Revheim | A01L 3/02 |
| | | | 168/18 |
| 2014/0360053 A1 | 12/2014 | Morris | |
| 2015/0053148 A1* | 2/2015 | Huang | A01K 13/007 |
| | | | 119/850 |
| 2015/0101833 A1* | 4/2015 | Ford | A01K 13/007 |
| | | | 168/26 |

\* cited by examiner

LIGHTWEIGHT FLEXIBLE DOG SHOES

BACKGROUND

A dog's feet and paws allow the animal to perform all of the things that make a dog the active and energetic companion that most dog owners enjoy. The paws are complex appendages that provide for mobility and navigation around obstacles, shock absorption, traction, digging, and sometimes gripping of bones and other objects such as sticks and toys. The pads of a dog's paws are made of fatty tissue for insulation from cold or hot weather conditions and for protection from abrasion. A dog's sweat glands are located on the paws which help them cool off in hot weather. Common problems experienced at the paws include cuts, abrasions, tears, blisters, bacterial or fungus infections, burns or blisters caused by contact with hot surfaces, frostbite from cold weather or temperatures, chemical burns from de-icing salt, as well as ticks, or mites. Signs of injury usually include excessive licking of the paws, limping, or bleeding at the foot. Therefore there is a need for some dog owners to equip their dog with shoes or booties in order to prevent injury or for protection during recovery and healing.

SUMMARY

The present invention comprises lightweight and flexible dog shoes for protecting a dog's feet and paws from temperature extremes, cold weather, hot surfaces, chemical burns, dirty street conditions, sharp objects, de-icing salt, broken glass, etc., while providing added traction in slippery or uneven terrain. By providing a barrier between a dog's paws and the external environment, the shoes protect a dog's feet and paws from cold weather conditions and from frostbite, and also protect the dog from hot weather conditions and hot surface temperatures, which can cause blisters or burns on the paws. Additionally, the shoes protect against chemicals such as de-icing salt commonly found on sidewalks and driveways in the wintertime. The shoes are fully waterproof and keep the dog's feet and paws dry in wet weather conditions. The material and construction of the dog shoes allow for breathability, for air to circulate within the shoes, while keeping water out.

The shoes may be embodied in a nylon and synthetic material construction which provides for a flexible fit that conforms to the shape of the dog's feet and allow tactile feeling in the paws and soles through the integrated synthetic rubber sole which may be comprised of resin rubber, crepe, PVC, or polyurethane. The dog is able to feel the ground through the shoes and is provided with added traction with the synthetic rubber material in the soles. With a vertical slit rear opening, the shoes open up in the rear and allow the dog owner to slip them over the dog's feet and paws. The shoes are secured and adjusted with dual Velcro straps which wrap around the dog's leg at the rear of the shoe for a snug and comfortable fit. A reflective coating is provided on the Velcro straps for light reflectivity, increased visibility, and safety during nighttime. At the top of the shoes, a wrap-around strap and button closure is integrated for a secure and final adjustment and to seal the shoe from external conditions. Laces are provided in the front of the shoe for added stability, support and balance for and for shoe-like look and feel. The shoe is constructed with three pieces of synthetic washable fabric: 1) an inner contact layer; 2) a middle insulation thickness layer; and 3) an outer waterproof shell. The multi-layer three piece construction allows for added durability, protection, breathability and air circulation, and additionally is waterproof. Further waterproof functionality may be embodied in a durable water repellant ("DWR") finish coating applied and designed for specifically waterproofing ability and beading on the outer shell.

DETAILED DESCRIPTION

Figure 1:
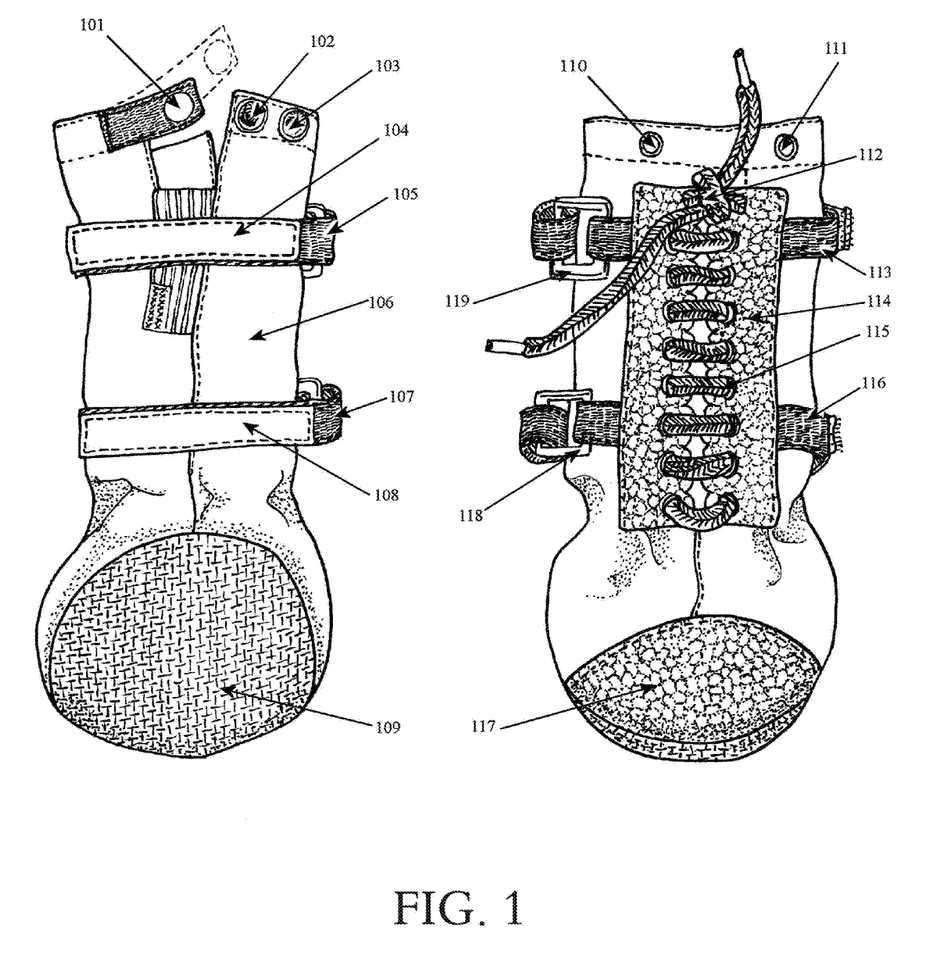
FIG. 1 is a detailed front and rear view of shoes; the rear mounted adjustable Velcro straps and the front facing laces. The top opening strap and dual wrap-around Velcro straps seal the shoe around the dog's leg. Durable synthetic rubber encloses the toe area and runs the bottom of the sole.

Lightweight and flexible dog shoes are described here for protecting a dog's feet and paws from temperature extremes, cold weather, hot surfaces, chemical burns, dirty street conditions, sharp objects, de-icing salt, broken glass, emergency conditions, extended travel distances, toxic chemical spills, or other extreme stresses potentially encountered by an owner's dog. The shoes provide a contoured and secure fit and enclosure for the dog's legs, feet and paws, and increase traction and stability on the ground. The shoes are waterproof to protect the dog's legs, feet and paws and provide breathability for comfort. FIG. 1 is a detailed view of the front and rear profiles of the dog shoe. The opening of the shoe is secured and adjusted with top opening strap snap-buttons 101, 102, and 103. The shoe is adjusted and secured to the dog's limbs and ankle area above the paws with Velcro straps 104, 105, 107, and 108. Reflective coating 104, 108 is provided on the Velcro straps for increased visibility and safety during nighttime or low light conditions. The sole 109 is a synthetic rubber material (i.e., resin rubber, crepe, PVC, or polyurethane) for added traction and to provide tactile feeling in the dog's paws. The synthetic rubber sole material is sewn into the bottom 109 and encloses the toe area 117. The front of the shoe is provided with a lace up feature and laces 112, 115 for the look and feel of a shoe and for added support with the structure 114. The dual Velcro straps are adjusted around the boot 113, 116 with nylon buckles 118 and 119.

Figure 2:
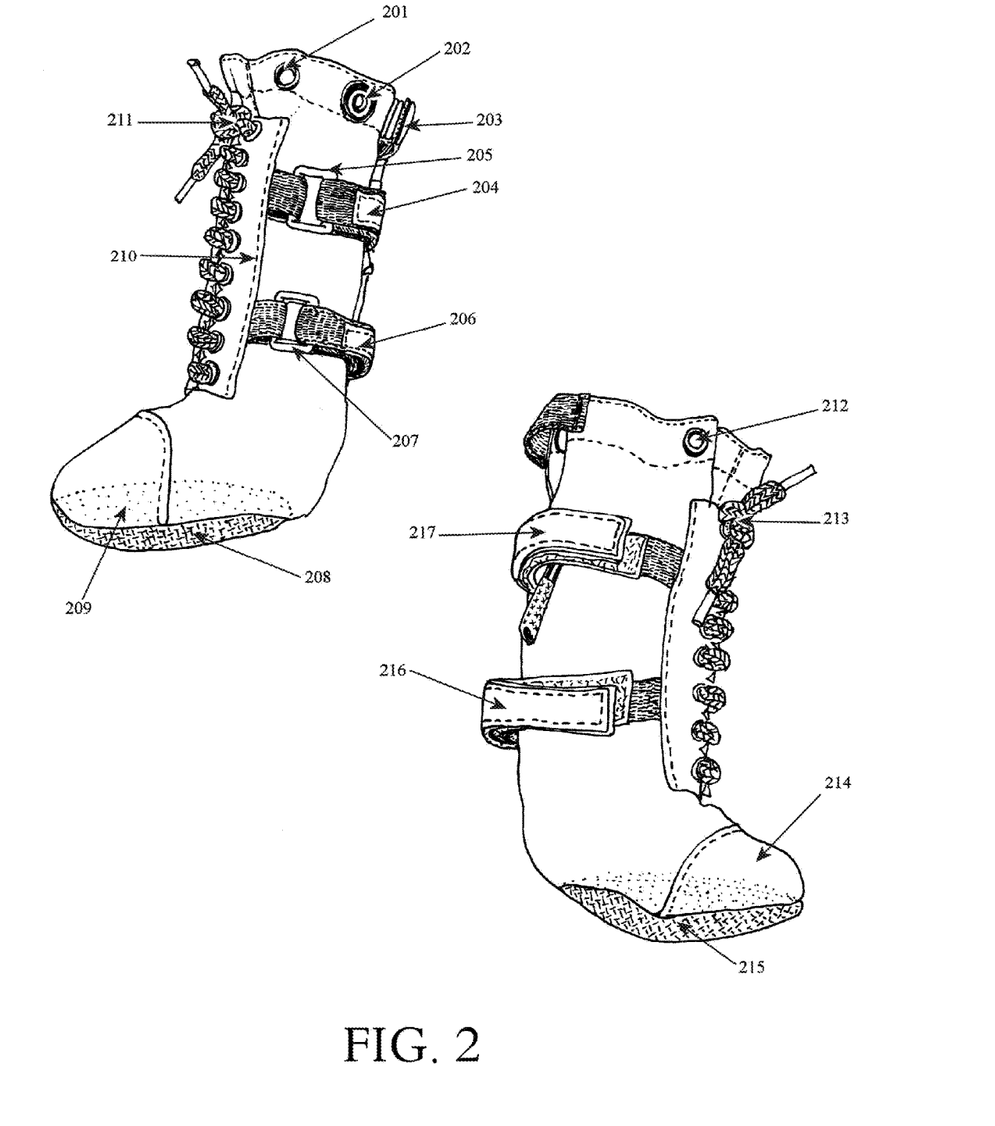
FIG. 2 is a left and right side profile view of the dog shoes showing the front-facing laces, rear mounted Velcro straps, top opening strap, and toe enclosure stitching of the durable synthetic rubber.

The left and right side views are shown in FIG. 2 detailing the lightweight and flexible contoured shape of the dog shoes. The top opening is adjustable with buttons 202 and a strap mechanism 203. Dual Velcro straps 204, 206 provide a secure and snug fit to the dog's leg and ankle area above the paws. The straps are adjusted with nylon buckles 205, 207 and secured with Velcro around the back of the dog's leg at 216 and 217. The front-facing laces 211, 213 provide added support and are affixed to the shoe via the structure at 210 and sewn into the front of the shoe. The toe area 209, 214 is provided with added stitching around the synthetic rubber toe enclosure. The soles 208, 215 run the bottom with a durable synthetic rubber material for added protection from the external environment, traction and stability, and provide the dog with tactile feel.

Figure 3:
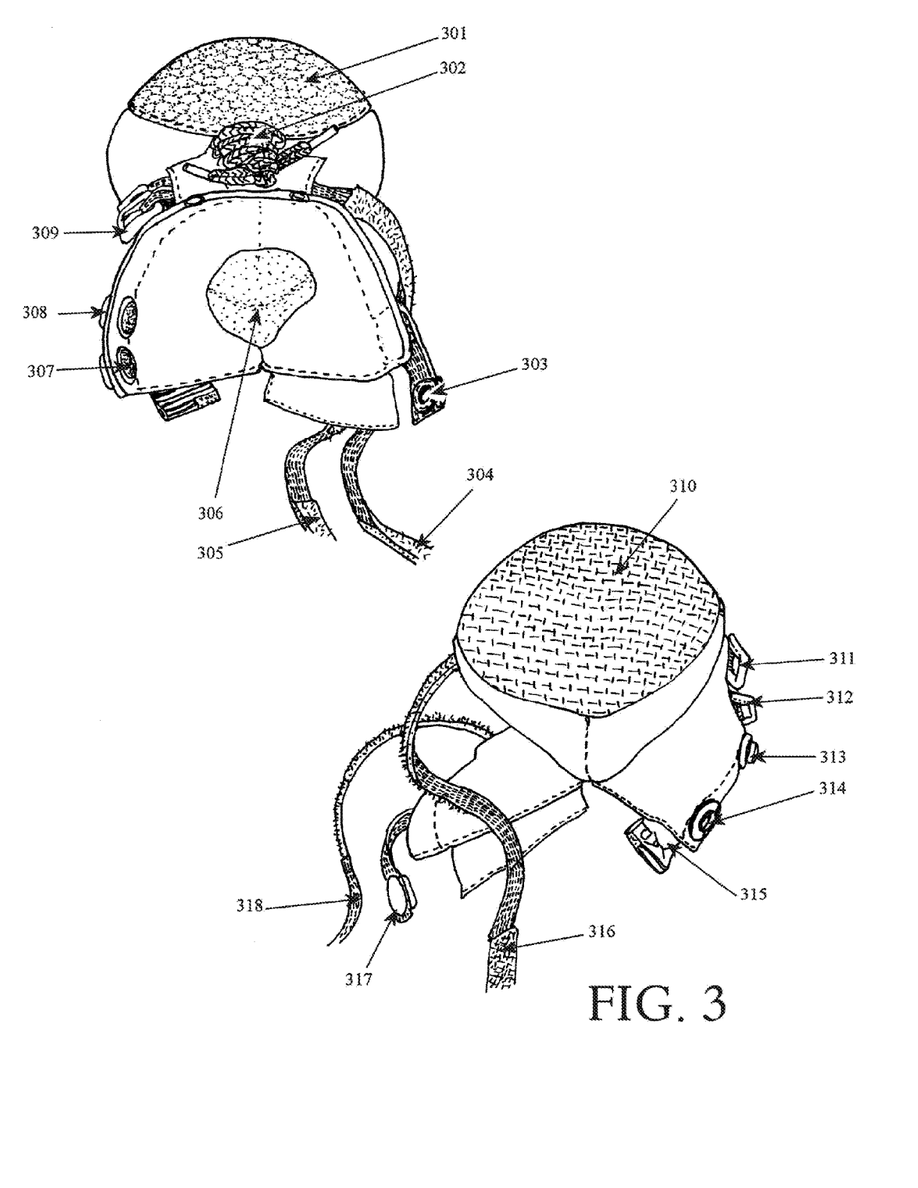
FIG. 3 is a detailed view of the top opening and bottom view of the synthetic rubber sole and associated wrap-around Velcro and button straps, buckles, and laces.

The top opening and bottom sole area is shown in detail in FIG. 3. The top opening 306 is where the dog's paws enter the boot. The top opening strap and snap-button 303, 317 is secured to the buttons 307, 308, 313, and 314. The dual Velcro straps 304, 305, 316, 318 are wrapped around the back of the dog's limb and ankle area and secured through the nylon buckles at 309, 311, 312. The bottom view of the shoe is shown in FIG. 3 with the synthetic rubber material at the sole 310 for added traction, support and tactile feel during use. The "YAP" logo is stitched on at 315 to show that the shoes are a genuine pair of shoes manufactured and sold by YAP Designs Inc.

Figure 4:
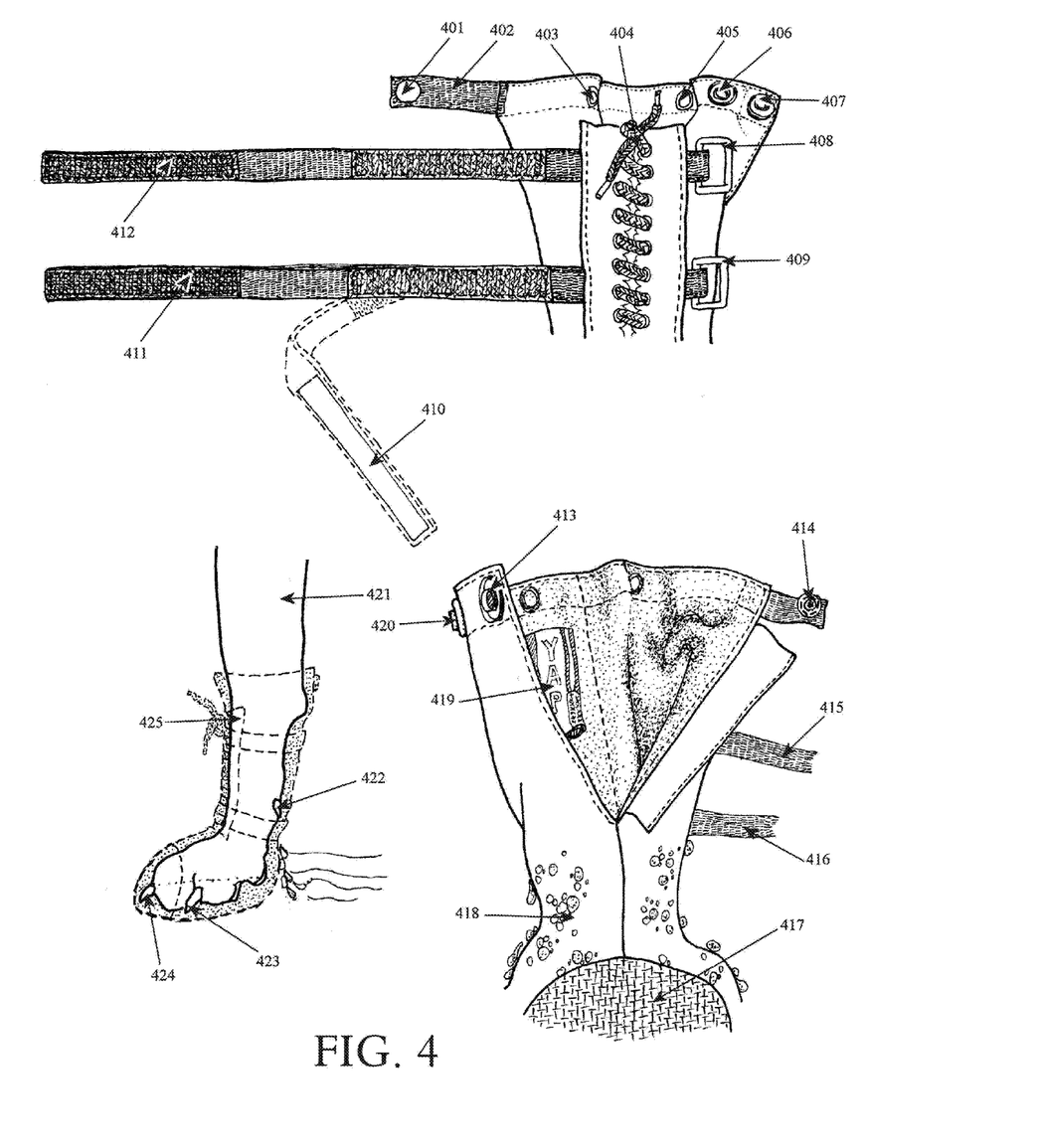
FIG. 4 is a detailed view of the wrap-around adjustable Velcro strap mechanism, buckles, front laces, top opening strap, buttons, and dog leg and paw profile view.

FIG. 4 illustrates the dual Velcro strap and top opening strap-button adjustment mechanism. The dual Velcro straps 412, 411 wrap around the back of the dog's limbs and are looped through nylon buckles 408, 409 and secured with Velcro. Reflective material is added on the straps at 410 to provide increased visibility and safety during nighttime and low light conditions. The top opening strap is secured with the strap 402 and button 401 mechanism to the buttons at 406 and 407 and provides closure around the dog's upper leg area. The front facing laces 404 are provided for added support and stability along the front of the shoe. The rear opening is shown in FIG. 4 with the top opening secured by the strap and button 414 mechanism and the buttons on the opposite side of the top opening at 413 and 420. The dog's paw and leg enter the shoe from the rear opening and are secured by wrapping around the Velcro straps 415, 416, through the nylon buckles 408, 409 and securing the Velcro at the desired comfort level and fit. The dogs paw 422, 423, 424 and limb 421 profile is shown comfortably and securely inside the shoe. Dotted lines are provided to show where the Velcro straps wrap around the dog's limb 421 above the paw. The durable water repellant ("DWR") finish is shown at 418 to keep the dog's feet and paws dry while allowing breathability and air circulation. The synthetic rubber sole 417 provides added traction, support and tactile feel during use.

The dog owner fits the shoes to the dog by first placing the foot and paw through the rear opening of the shoe with the top opening strap 414, 402 open, and the dual Velcro straps open 412, 411, 415, 416. Then the lower Velcro strap 411, 416 is wrapped around the dog's leg 421 to the desired fit, looped through the buckle 409, and secured with Velcro. Next, the upper Velcro strap 412, 415 is similarly wrapped around the dog's leg 421, looped through the buckle 408, and secured with Velcro. Then the top opening strap 402, 414 is wrapped around the top opening of the shoe and around the dog's leg 421 for a secure fit, closure, and snapped to a button 406, 407, 413, 420. The front lace mechanism 404 is tied and provides added support.

Figure 5:
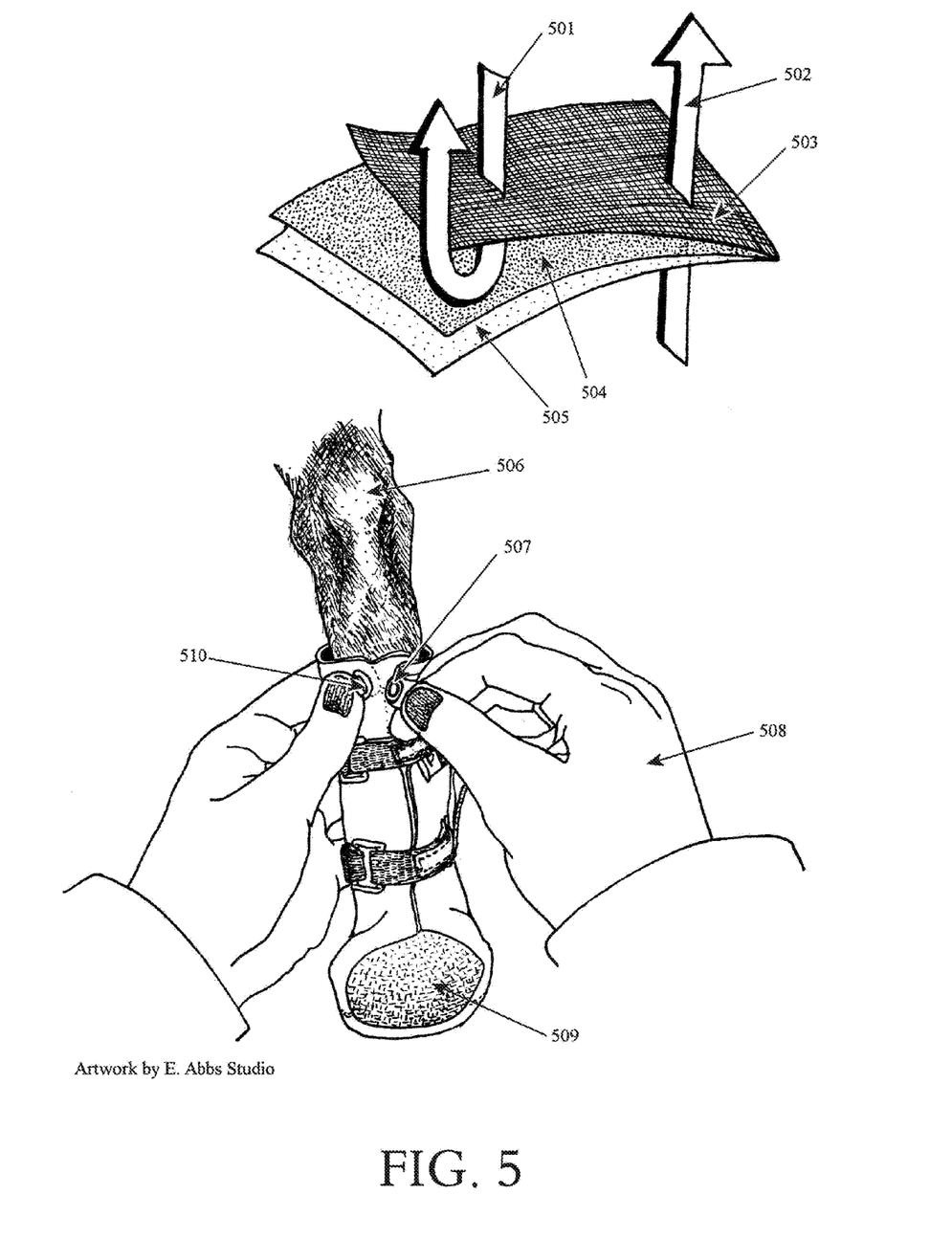
FIG. 5 is a detailed view of putting the shoes on, the rear mounted Velcro straps and top opening button-strap closure. A graphical representation is provided of the durable water repellant ("DWR") waterproofing and breathability functionality.

FIG. 5 shows the dog owner's hands 508 securing and adjusting the top opening strap 507 and button 510 mechanism at the back of the shoe. The dog's leg 506 is comfortably and securely protected with the lightweight and flexible dog shoes. The synthetic rubber sole 509 is shown for added traction, stability and tactile feel during walking and running. The shoe is constructed with three pieces of synthetic washable fabric: 1) an inner contact layer 505; 2) a middle insulation thickness layer 504; and 3) an outer waterproof shell 503. The graphic representation shows the waterproofing and breathability functionality as water is kept out of the shoe 501 while air is able to pass through the breathable fabric 502. Durable water repellant ("DWR") finish coating is applied at the outer shell 503.

Figure 6:
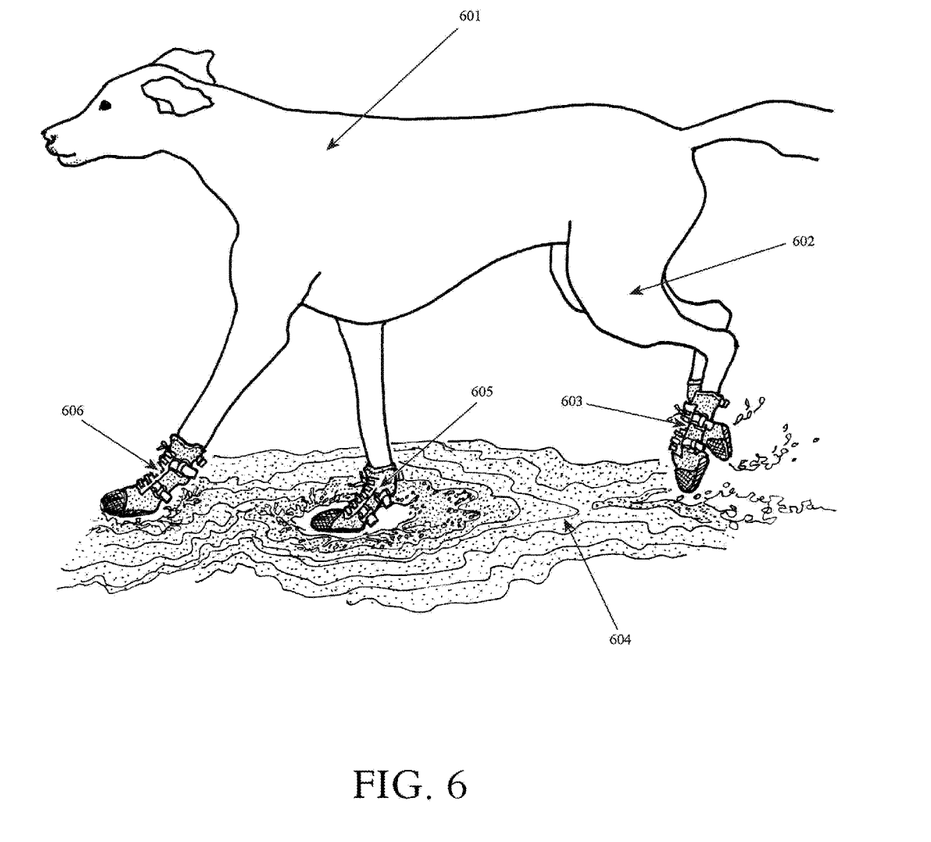
FIG. 6 is a dog running with the lightweight and flexible dog shoes. The shoes protect the dog's feet and paws from a chemical spill or harmful external surface conditions.

FIG. 6 shows the dog 601 running with the lightweight and flexible dog shoes in a potentially hazardous environmental condition 604. The shoes 603, 605, 606 are comfortably and securely fitted to the dog's legs, feet and paws and protect the dog from the environment with the durable three piece shell and synthetic rubber soles.

The invention claimed is:

1. A lightweight and flexible dog shoe for protecting a dog's feet and paws comprising:
    a rear opening for inserting the dog's paws and leg;
    a first and second Velcro strap adjustment mechanism for wrapping around the dog's leg and for securing and adjusting the rear opening;
    a top strap and button mechanism for securing and adjusting the top opening;
    front-facing laces for added stability, support and balance; and
    a synthetic rubber sole for traction and tactile feel;
    wherein the shoe is fitted to the dog by putting the dog's paws through the rear opening, tightening the first and second Velcro straps, tightening the front-facing laces and then tightening the top strap and button mechanism.

2. The lightweight and flexible dog shoe of claim 1, wherein the shoe comprises a three layer shell; an inner contact layer; a middle insulation thickness layer; and an outer waterproof shell.

3. The lightweight and flexible dog shoe of claim 1, wherein the shoe is coated with a durable water repellent treatment.

4. The lightweight and flexible dog shoe of claim 1, wherein the first and second Velcro strap adjustment mechanism is covered in a light reflective coating.

5. The lightweight and flexible dog shoe of claim 1, wherein the shoe is constructed with breathable synthetic fabric.

6. The lightweight and flexible dog shoe of claim 1, wherein the shoe is available in extra-small, small, medium, large and extra-large sizes.

7. The lightweight and flexible dog shoe of claim 1, wherein the toe area is enclosed with in a synthetic rubber material.

8. A lightweight and flexible dog shoe for protecting a dog's feet and paws, comprising:
    a rear-entry opening for putting the shoe on the dog's feet;
    a first and second Velcro strap for securing the shoe around the dog's leg;
    a top strap and button mechanism for securing the shoe opening;
    front-facing laces for added stability, support and balance;
    a durable fabric construction in three pieces, a first protective layer, a second insulating layer, and a third outer waterproof layer; and
    a synthetic rubber sole for traction and tactile feeling;
    wherein the outer waterproof layer is treated with a durable water repellant finish to keep the dog's feet and paws dry while allowing breathability.

9. The lightweight and flexible dog shoe of claim 8, wherein the toe is enclosed in a durable synthetic rubber material.

10. The lightweight and flexible dog shoe of claim 8, wherein the durable fabric construction fully conforms to the contours of the dog's feet and paws.

11. The lightweight and flexible dog shoe of claim 8, wherein the shoe is available in extra-small, small, medium, large, or extra-large sizes.

12. The lightweight and flexible dog shoe of claim 8, wherein the top strap and button mechanism provides closure and seals the shoe from the external environment.

13. The lightweight and flexible dog shoe of claim 8, wherein the durable fabric construction is fully washable.

14. The lightweight and flexible dog shoe of claim 8, wherein the first and second Velcro strap adjustment mechanism is covered in a light reflective coating.

15. A method for comfortably securing dog shoes to a dog's feet and paws comprising:
   - inserting the dog's feet through a rear entry opening;
   - wrapping a first strap around the dog's leg, through a buckle, and securing with Velcro;
   - wrapping a second strap around the dog's leg, through a buckle, and securing with Velcro;
   - tightening the front-facing laces for added stability, support and balance; and
   - wrapping a top opening strap around the dog's leg to seal the shoe from the external environment;

wherein the dog shoes are constructed of a lightweight and flexible fabric material that provides a breathable and waterproof fit; and wherein the sole and toe enclosure are protected with a synthetic rubber material.

16. The method of claim 15, wherein the dog shoes protect the dog's feet from cold weather, hot surface conditions, chemicals, cuts and abrasion, or other harmful or hazardous external conditions.

17. The method of claim 15, wherein the dog shoes comprise a durable fabric construction in three pieces, a first protective inner contact layer, a second insulating thickness layer, and a third outer waterproof shell.

18. The method of claim 15, wherein the first and second Velcro strap comprise a reflective coating for added visibility during nighttime and low light conditions.

19. The method of claim 15, wherein the shoes are coated with a durable water repellent treatment.

20. The method of claim 15, wherein the toe area is enclosed in a synthetic rubber material.

* * * * *